UNITED STATES PATENT OFFICE.

ERNST BAUER, OF WILLIAMSBURG, NEW YORK.

IMPROVEMENT IN METHODS OF PREPARING ANIMAL HOSE.

Specification forming part of Letters Patent No. 169,076, dated October 26, 1875; application filed August 9, 1875.

*To all whom it may concern:*

Be it known that I, ERNST BAUER, of Williamsburg, Kings county, New York, have invented an Improved Method of Preparing Animal Hose, of which the following is a specification:

This invention relates to an improved method of preparing the gullet or esophagus, the weasand, (windpipe,) and the intestines of animals, for the purpose of producing animal hose, used for filling beer, ale, and other liquids from the brewers' tanks or other reservoirs into barrels, casks or other vessels.

In filling barrels with beer or similar liquid it is necessary to use a hose which is perfectly smooth, so it will allow the liquid to pass through without causing it to foam. If a hose having a rough surface is used, the liquid will be caused to foam, and the barrel will be imperfectly filled and much time wasted in finally filling the same. The hose should also be impervious to the liquid to be durable.

By my improved method the animal hose will be rendered perfectly smooth and impervious, and therefore well adapted for conducting the liquids into barrels or other receptacles.

The following is my process: For preparing about one hundred gullets, I first compound the following mixture, in about the proportions set forth, to wit: one-fourth of an ounce of alum; one ounce of willow bark; one ounce of sumac; two nut-galls. The willow bark is cut into short pieces, the sumac is reduced to a fine powder, and the galls are also crushed and powdered. These ingredients are dissolved in about two quarts of water, and the whole mixture is then boiled. I also dissolve about three ounces of catechu and two ounces of gum kino in half a pint of cold water, stirring the mixture well to obtain a perfect solution.

The two mixtures above described are next put together into one vessel, and constitute the composition with which I treat, smooth, and harden the animal hose.

The gullet, wind-pipe, or intestines to be prepared are first trimmed by ripping and drawing off the outside coating of fatty and useless matter. They are then steeped into the above mixture, preferably so that first one end and then the other is inserted. Care must be taken, in steeping, that the liquor reach the inner as well as the outer side of the hose, so that both be properly prepared. The hose is to be in contact with the liquid for about three minutes, and is then blown full of air and suspended for drying. When dry, it will be found hard and smooth.

When to be used, the hose is first put in warm water, which softens it and renders it quite elastic. In use it will remain practically impervious to the beer or other liquid for a long period—much longer, indeed, than hose not prepared as above described.

The hose may be taken from various animals. That of beeves is preferred.

The willow bark and nut-galls may be omitted in the mixture; but their presence is desirable, the bark to render the hose softer, the galls to render it more impervious.

I claim as my invention—

1. The process herein described of tanning animal hose by steeping it in a mixture of alum, sumac, catechu, gum kino, nut-galls, willow bark, and water, substantially as specified.

2. The animal hose hardened and rendered smooth and impervious, substantially as specified.

ERNST BAUER.

Witnesses:
 A. V. BRIESEN,
 F. V. BRIESEN.